May 9, 1950 — W. G. PATRIQUIN — 2,507,267
SHOCK ABSORBER
Filed June 8, 1948

INVENTOR.
William G Patriquin
BY Hudson, Boughton,
Williams, David & Hoffmann
Attorneys Patented May 9, 1950

2,507,267

UNITED STATES PATENT OFFICE 2,507,267

SHOCK ABSORBER

William G. Patriquin, Cleveland, Ohio, assignor to The Gabriel Company, Cleveland, Ohio, a corporation of Ohio Application June 8, 1948, Serial No. 31,813

2 Claims. (Cl. 188—88)

This invention relates to a shock absorber and particularly to a fluid shock absorber. Although the invention is applicable to various types of fluid shock absorbers it is illustrated and explained herein by way of example as embodied in a direct double acting hydraulic shock absorber.

This invention in certain of its aspects is an improvement on the inventions disclosed in Beecher Patent 2,394,356, February 5, 1946, and Beecher Patent 2,396,227, March 12, 1946. In said Beecher patents the piston is provided with a shiftable flexible packing ring that performs the dual function of a piston packing ring and a valve and this ring is mounted on a carrier which has sliding movement on, and axially of, the piston. In said Beecher patents the flexible ring normally overlies and seals peripheral passages or grooves on the piston. In the operation of the shock absorbers shown in said Beecher patents there is a tendency for the flexible packing ring to have portions thereof squeezed into the peripheral passages, particularly if said passages are relatively large adjacent to the ring. This results in rapid deterioration and wear on the flexible packing ring.

An object of the present invention is to provide a shock absorber construction such as shown in said Beecher patents but wherein the peripheral grooves on the piston can be made relatively large while likelihood or danger of the flexible packing ring and valve working into said grooves during the operation of the shock absorber is completely avoided, thus increasing the effective life and the efficiency of the packing ring and valve.

Another object is to provide a shock absorber of the type specified and wherein the packing ring and valve is held by means of a spring in its normal position with a predetermined compressing force on the ring, while the ring may be further compressed during the initial portion of the impact stroke of the shock absorber to provide bleed openings through the piston prior to the ring and its carrier moving bodily axially of the piston against the spring means under built-up impact pressures.

Further and additional objects and advantages not hereinbefore referred to will become apparent hereinafter during the following description of an embodiment of the invention. Referring to the accompanying drawing illustrating such embodiment of the invention, Fig. 1 is a view partly in longitudinal section and partly in elevation of a direct double acting hydraulic shock absorber;

Figure 1:
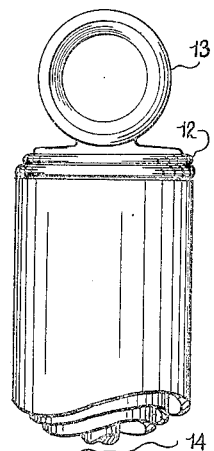

The shock absorber illustrated comprises a substantially cylindrical casing 10 which has relative telescoping movement within a cylindrical guard housing 11 that is spaced radially outwardly from the casing 10. The upper end of the housing 11 is closed by an inverted cup-shaped closure or cap member 12 provided on its outer side with an eye 13 while the piston rod 14 is operatively connected to the member 12 and eye 13. The lower end of the casing 10 is closed by a cup-shaped closure member 15 which has secured to its outer side a lower eye 16. The closure members 12 and 15 extend into the housing 11 and the casing 10, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in substantially parallel relationship and pass through the eyes 13 and 16. These pins or rods may be operatively connected with the eyes 13 and 16 by suitable means, well known in the art, wherefore relative movement between the frame and axle of the vehicle will cause relative telescoping movement between the casing 10 and the housing 11 and relative movement of the piston rod 14 and the piston secured thereto in the pressure or working cylinder now to be described and well understood in the art.

The pressure or working cylinder 17 of the shock absorber is disposed within the casing 10 in spaced concentric relationship therewith so that the space defined by the casing 10, cylinder 17, closure member 15 and a suitable closure member for the upper end of the casing and cylinder (not shown but well understood in the art) constitutes a reservoir 18 for the oil, liquid or fluid in the shock absorber.

The lower end of the cylinder 17 extends into the cup shaped closure member 15 and is secured thereto by suitable means understood in the art. The cylinder 17 slightly upwardly of its lower end has secured therein a closure plate 19. The cylinder 17 below the closure plate 19 is provided with an inwardly extending bead 20 which serves to retain the closure plate in position while the cup shaped closure member 15 is provided with a plurality of circumferentially spaced internal grooves or channels 21 which place the reservoir 18 in communication with the space between the closure plate 19 and the bottom of the cup shaped closure member 15. The closure plate 19 may be provided with a fixed orifice through which oil can pass from the working cylinder to the reservoir during the impact stroke and also it may be provided with a suitable spring-pressed replenishing valve 19a which opens during the recoil stroke to allow a relatively rapid flow of oil from the reservoir to the working cylinder. The upper or high pressure end of the cylinder 17 is closed by plug member (not shown but well understood) which fits into the cylinder and is suitably secured in position therein and is provided with a central opening through which the piston rod slidably extends. It will be understood that suitable packing is provided at the upper end of the shock absorber to prevent the escape or leakage of oil.

The piston rod 14 at its inner end is externally threaded as indicated at 22, while just above the threads 22 the piston rod is provided with an annular recess or groove 23. The piston comprises a body which may be formed in various ways but preferably it is a die casting. The piston body includes a lower and larger portion 24 and an upper and reduced portion 25. The periphery of the lower portion 24 of the piston body is provided with a plurality of circularly spaced axially extending grooves or passages 26, while intermediate said grooves or passages are axially extending ribs 27 which have sliding fit in the cylinder 17. The upper ends of the grooves or passages 26 are chamfered as indicated at 26a, while the upper ends of the ribs 27 are shouldered as indicated at 27a. In a shock absorber embodying the present invention the grooves or passages 26 may be of substantial depth for a reason later to become apparent. In the present illustration eight of the grooves or passages 26 are shown but it should be understood that the number of these grooves or passages may be varied.

The lower portion 24 of the piston body is provided with a counterbore 28, the wall of which is threaded as indicated at 29 for a purpose later to be explained. The inner end of the counterbore 28, that is the upper end of the portion 24 of the piston body, is separated from the upper reduced or smaller piston portion 25 by wall 30 in the center of which is a bore 31 communicating with the counterbore 28 and with a larger central bore 32 in the upper portion 25 of the piston body. The wall 30 surrounding the bore 31 is provided with an annular recoil valve seat boss 33 projecting into the counterbore 28 and provided with three radially extending bleed grooves or notches 34 angularly spaced circularly of the seat boss 33.

The upper portion 25 of the piston body is provided with the previously referred to central bore 32 which is threaded so that the threaded end 22 of the piston rod 14 can be screwed into the bore 32 in uniting the piston body to the piston rod. The upper portion 25 of the piston body is also provided radially outwardly of the bore 32 with a plurality of circularly spaced axially extending peripheral recesses or grooves 36 which extend from the lower piston part 24 to the upper end of the piston part 25. The recesses 36 are shown as substantially semicircular in cross section and are illustrated herein as eight in number. The recesses 36 can be die cast or otherwise formed in the piston body. The piston portion 25 is provided with ports 37 which place the lower end of the bore 32 in communication with certain of the recesses or grooves 36 it being noted that four of the ports 37 are illustrated and that these ports communicate with alternate grooves or recesses 36.

A spring abutment plate or washer 38 is provided with an opening 39 similar to a bayonet slot, wherefore the piston rod 14 can be passed through the enlarged part of said opening 39 and then the plate or washer 38 can be moved transversely relative to the piston rod to bring said rod into the smaller part of the slot 39 with the edge of said smaller part engaging in the annular groove 23 of the piston rod and with the washer or plate 38 engaging the end of the piston part 25 with said washer forming an assembly abutment for the piston body. The large part of the bayonet slot 39 of the washer or plate 38 overlies one or more of the recesses 36 and the washer or plate is provided with a plurality of openings 40 which overlie other of the recesses 36 in the upper piston portion 25 of the piston body. The upper portion 25 of the piston body is provided with one or more axially extending lugs 41 which when the parts are assembled engage in openings 42 in the washer or plate 38 and act to hold said washer or plate against rotation relative to the piston body. The washer or plate 38 is of less diameter than the internal diameter of the working cylinder 17 wherefore an annular space is provided between the circumference of said washer or plate and the wall of the cylinder.

A flexible packing and valve ring or element 43 of normally circular cross section and formed of any suitable material such as synthetic rubber, for example, is mounted on a rigid carrier 44 which is slidable on the upper portion 25 of the piston body. The carrier 44 is in the form of a ring of angular cross section having an arm 44a that extends longitudinally or axially of the piston and which contacts the piston portion 25 and slides therealong and a radially extending arm 44b which overlies the upper side of the ring 43 as viewed in the drawing. It will thus be seen that the ring 43 moves with the carrier 44 toward and away from the piston portion 24 upon changes in direction of piston movement and sealingly contacts the cylinder 17. The arm 44a of the carrier has its length determined so that when the ring 43 is in position indicated in Fig. 2 the free end of the arm 44a positively abuts the piston portion 24 and the carrier cannot move farther toward said portion and consequently the distorting or squeezing force of the carrier arm 44b on the ring 43 in a direction axially of the piston can be predetermined to provide for a predetermined distortion of the ring from its normally circular cross section. The arm 44a in its lower edge is provided with circularly spaced arcuately extending notches 45 for a purpose later to be explained.

A flat ring 46 is mounted on the carrier 44 intermediate the packing ring or valve 43 and the large portion 24 of the piston body and said ring 46 moves with the carrier 44 and the packing ring 43. The ring 46 may be formed of any suitable rigid material such as fibre, metal, or any other similar material. The ring 46 together with the carrier 44 provides at all times an annular groove for the packing ring 43 and which groove is of less width than the diameter of the normally circular cross section of the packing ring wherefore the packing ring 43 has no independent rolling movement in the groove.

Figure 2:
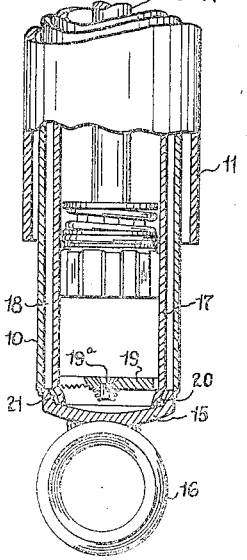
Fig. 2 is an enlarged fragmentary sectional view through the working cylinder of the shock absorber with the piston shown partly in section and partly in elevation, the parts of the piston being indicated in the positions they may occupy during the recoil or upward stroke of the piston in the working cylinder.
Figure 2:
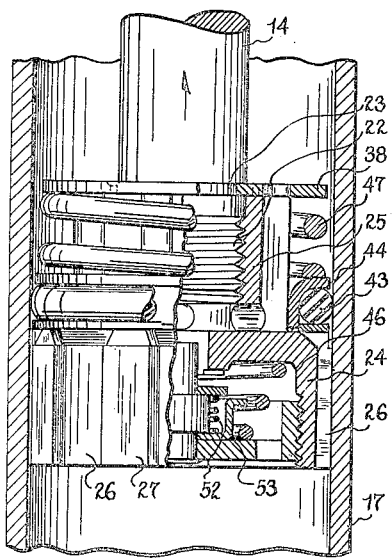
Figure 3:
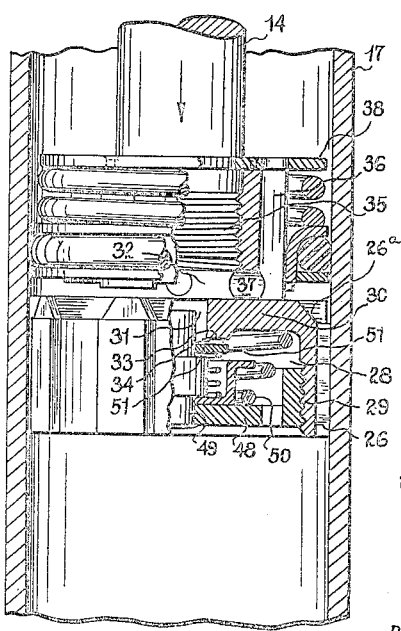
Fig. 3 is a view similar to Fig. 2 but showing the parts of the piston in the positions they may occupy during the impact or downward stroke of the piston in the working cylinder.
Figure 4:
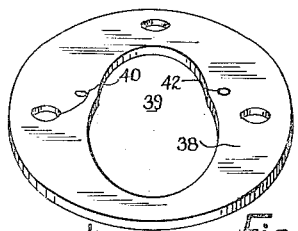
Figs. 4, 5, 6 and 7 are perspective views of certain of the parts of the piston.
Figure 5:
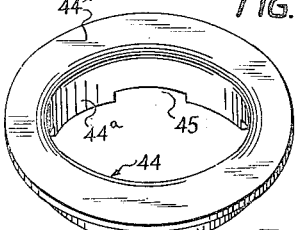
Figure 6:
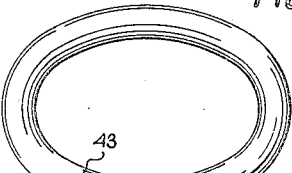
Figure 7:
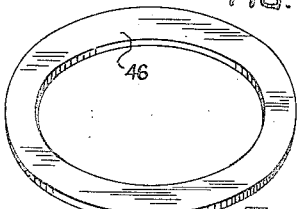
Figure 8:
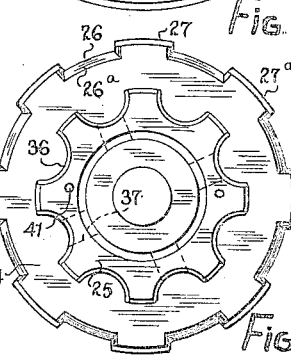
Fig. 8 is an end elevational view of the piston when the parts shown in Figs. 4, 5, 6 and 7 are removed and is taken looking from the upper end of the piston as viewed in the drawings.

A coil spring 47 of predetermined strength surrounds the portion 25 of the piston body and abuts the plate or washer 38 and the arm 44b of the carrier 44 and normally maintains the carrier, the packing ring or valve 43 and the rigid ring 46 in the position shown in Fig. 2. When the carrier 44 and its associated parts are in the position shown in Fig. 2, the rigid ring 46 overlies the upper end of the peripheral grooves or passages 26 in the piston body and functions together with the packing ring 43 to seal said peripheral grooves or passages against the flow of oil therethrough. When the piston is moving in a direction to cause hydraulic pressure to be exerted on the rigid ring 46, i. e. in a downward direction during the impact stroke, the hydraulic pressure, before it exceeds the strength of the spring 47, will cause the ring 46 to move slightly on the carrier against the packing ring 43 to further compress said ring from its normal circular cross section and such movement of the ring 46 relative to the carrier 44 and the packing ring 43 will provide for limited bleeding of the oil through the passages 26, the arcuate notches 45 in the arm 44a of the carrier 44 and thence through the passages or grooves 36 in the piston portion 25. When the hydraulic pressure referred to attains to a predetermined pressure that will overcome the action of the spring 47, then the carrier 44, packing ring 43 and ring 46 move as a unit axially of the piston from the position shown in Fig. 2 to the position shown in Fig. 3 to effect a relatively complete opening or unsealing of the passages 26 to allow the oil to flow freely through said passages beneath the lower end of the arm 44a of the carrier and thence through the grooves or passages 36 of the upper piston portion 25. It will be noted that even though the passages 26 are relatively deep there will be no likelihood of the packing ring 43 being squeezed into said grooves or passages during the operation of the shock absorber because the rigid ring 46 prevents this. Consequently, the life of the packing ring 43 is materially extended.

A threaded cup shaped member 48 is screwed into the counterbore 28 of the large piston portion 24 and said cup shaped member mounts a central pin 49 that extends into the bore 31. The cup shaped member 48 is frictionally held against turning movement in the counterbore by a relatively strong spring 50. The recoil valve 51 in the form of a flat plate is slidable on the pin 49 and is normally held seated against the boss or valve seat 33 by a coil spring 52 contained within a cup shaped spring housing 53 carried by the cup member 48.

In order to more clearly bring out the advantages of the present invention a brief explanation of the operation of the shock absorber will now be explained. It will be assumed that the shock absorber and the reservoir are properly supplied with oil and that the shock absorber is mounted upon an automobile or other vehicle. It will be assumed that the wheels of the automobile or vehicle have engaged an obstruction so that the vehicle springs have been compressed with a resultant downward or impact movement of the piston in the working cylinder 17, such movement being indicated by the arrow in Fig. 3. During the initial portion of this movement the oil below the piston can only pass to the upper side of the piston through the bleed notches 34 in the recoil valve seat 33 it being understood that the oil passing from the counterbore 28 through such notches into the bore 31 then flows into the bore 32, through the ports 37 and thence through the grooves or passages 36 in the upper piston portion 25. The recoil valve 51 will remain seated throughout the impact or downward movement of the piston. When the pressure below the piston increases it will act through the oil in the grooves 26 to slightly move the rigid ring 46 axially of the piston and away from the piston portion 24 relative to the flexible ring 43 and carrier 44 to compress the flexible ring 43 and to provide additional bleed for the oil through the notches 45 in the arm 44a of the carrier 44 and thence through the grooves 36. Assuming that the pressure below the piston during the impact stroke builds up to a point where it exceeds the strength of the spring 47 then such pressure acting through the oil in the grooves 26 moves the rigid ring 46, the flexible ring 43 and the carrier 44 as a unit from the position shown in Fig. 2 toward the position shown in Fig. 3 compressing the spring 47 and allowing a relatively free flow of oil through the grooves 26 beneath the ring 46 and carrier 44 and thence through the grooves 36 into the cylinder at the upper side of the piston.

When the compressed vehicle springs expand or recoil the piston will move in its recoil stroke, i. e. in an upward direction as indicated by the arrow in Fig. 2. Instantly the spring 47 moves the carrier 44, packing ring 43 and rigid ring 46 as a unit to the position shown in Fig. 2 wherein the grooves or passages 26 are sealed and oil can flow from the upper side of the piston to the lower side thereof only through the bleed notches 34 in the recoil valve seat 33. However, when the pressure above the piston reaches a predetermined point the recoil valve spring 52 is overcome and the recoil valve 51 is unseated as indicated in Fig. 2 whereupon oil flows from the upper side of the piston through the grooves 36, ports 37, bores 32 and 31 and thence into the counterbore 28 and through suitable openings in the cup member 48.

It will be noted that during the upward or recoil stroke of the piston there would be a tendency for the flexible packing ring 43 to be squeezed into the relatively deep channels or grooves 26 were it not for the rigid ring 46 which prohibits the packing ring from doing this. Therefore, the packing ring 43 is not squeezed or extruded into the grooves 26 during the operation of the shock absorber with the result that the life of the packing ring is greatly extended.

Although a preferred embodiment of the invention has been illustrated and described herein it will be understood that the invention is susceptible of various modifications and adaptations within the scope of the appended claims.

Having thus described my invention, I claim:

1. In a fluid shock absorber, a cylinder, a piston reciprocable therein and including a reduced end portion spaced radially from said cylinder and a larger portion slidable in said cylinder, said piston having passage means extending from end to end thereof and communicating with the space between said reduced portion and the cylinder and adjacent the larger piston portion, said larger piston portion having peripheral grooves extending from end to end thereof and communicating with said space and having their ends adjacent to said space of greater depth than the depth of the remainder of the grooves, an annular carrier surrounding said reduced portion and having an arm extending axially thereof and slidable thereon and an arm extending radially of said space, a spring acting on said last named arm and urging said carrier toward said larger portion, a flexible packing ring mounted on said carrier and contacting the arms thereof and the cylinder wall, a rigid ring mounted on said carrier and contacting the axial arm thereof and said packing ring remote from said radially extending carrier arm, said packing ring and said rigid ring closing communication between said grooves and space when the free end of said axial arm abuts the larger piston portion, said rigid ring overlying the ends of greater depth of the peripheral grooves of the larger piston portion and preventing entry into said grooves of said packing ring; said carrier, packing ring and rigid ring being movable as a unit by said spring upon movement of the piston in its recoil stroke and movable as a unit by the fluid pressure during the movement of the piston in its impact stroke when said pressure exceeds the spring load.

2. A shock absorber as defined in claim 1 and wherein said axially extending arm of said carrier is provided in its free end with one or more notches wherefore during the initial portion of the impact stroke said rigid ring under fluid pressure will move slightly relative to said carrier and compress said packing ring and provide for a predetermined bleed of fluid through said one or more notches.

WILLIAM G. PATRIQUIN.

REFERENCES CITED

The following references are of record in the file of this patent:

UNITED STATES PATENTS

| Number | Name | Date |
|---|---|---|
| 2,394,356 | Beecher | Feb. 5, 1946 |
| 2,396,227 | Beecher | Mar. 12, 1946 |